Figure 1:
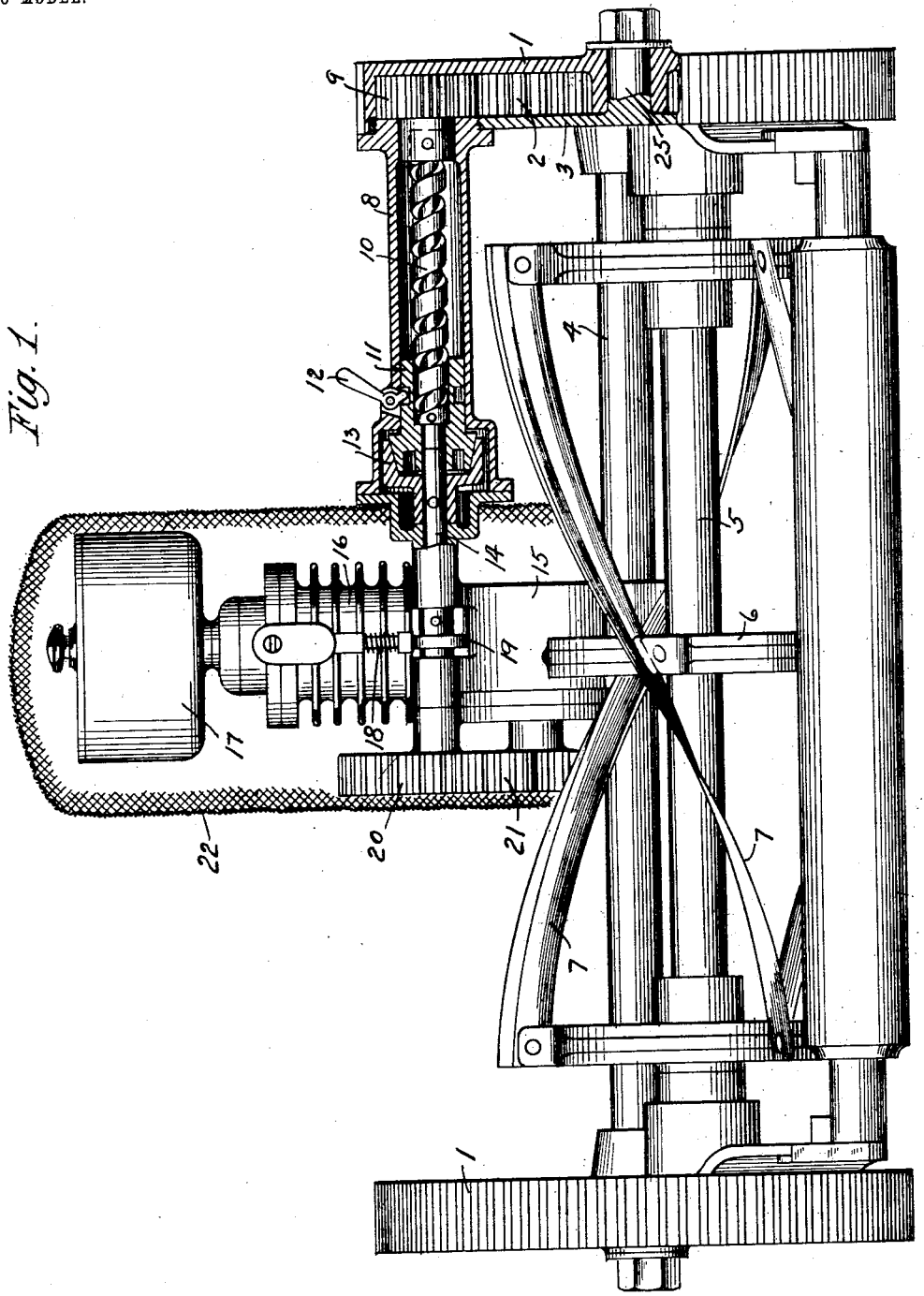

No. 750,616. PATENTED JAN. 26, 1904.
I. H. DAVIS.
MOTOR LAWN MOWER.
APPLICATION FILED MAR. 24, 1903.
NO MODEL. 2 SHEETS—SHEET 1.

WITNESSES: Jas. B. MacDonald. J. S. Custer

INVENTOR, Isaac H. Davis
By E. Wright Att'y.

No. 750,616. PATENTED JAN. 26, 1904.
I. H. DAVIS.
MOTOR LAWN MOWER.
APPLICATION FILED MAR. 24, 1903.
NO MODEL. 2 SHEETS—SHEET 2.
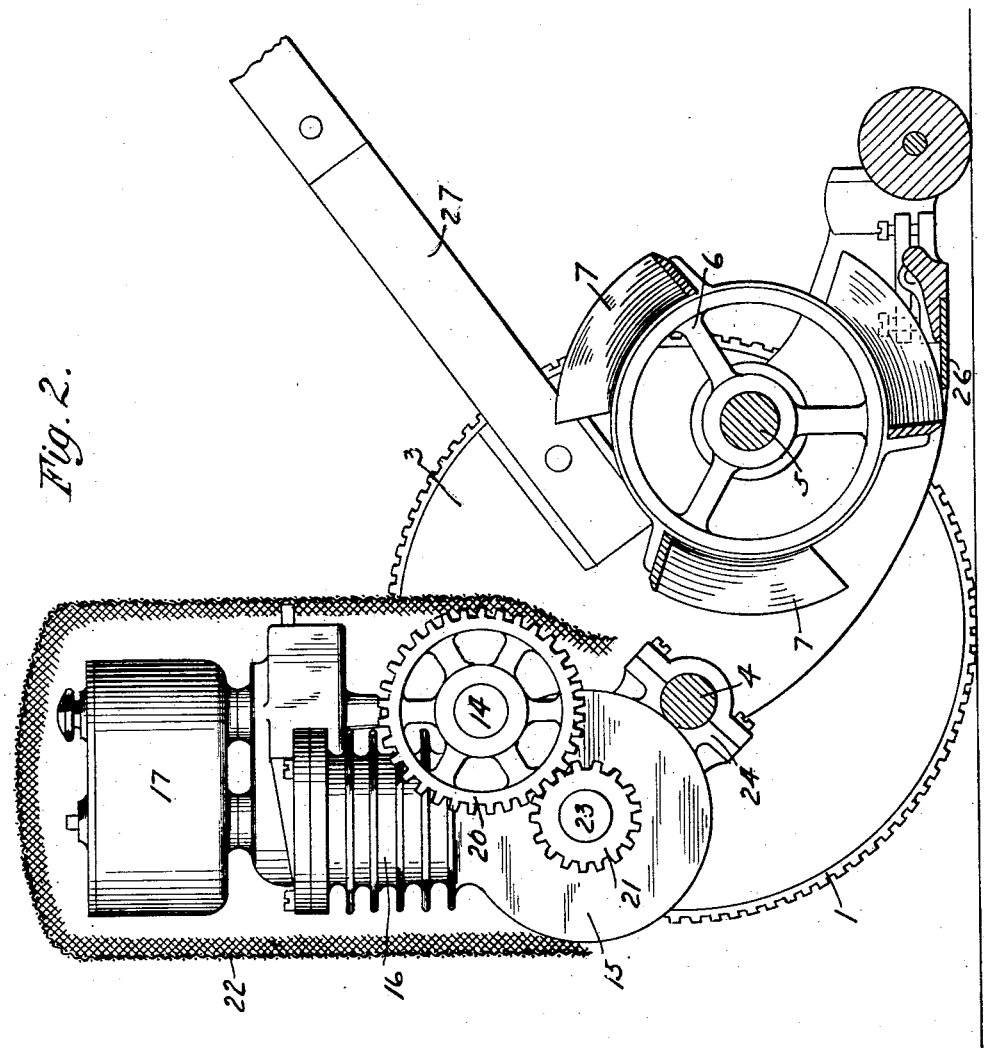

No. 750,616. Patented January 26, 1904.

UNITED STATES PATENT OFFICE.

ISAAC H. DAVIS, OF BOSTON, MASSACHUSETTS, ASSIGNOR OF ONE-HALF TO HENRY HERMAN WESTINGHOUSE, OF PITTSBURG, PENNSYLVANIA.

MOTOR LAWN-MOWER.

SPECIFICATION forming part of Letters Patent No. 750,616, dated January 26, 1904.

Application filed March 24, 1903. Serial No. 149,322. (No model.)

*To all whom it may concern:*

Be it known that I, ISAAC H. DAVIS, a citizen of the United States, residing in Boston, county of Suffolk, and State of Massachusetts, have invented a certain new and useful Improvement in Motor Lawn-Mowers, of which improvement the following is a specification.

This invention relates to lawn-mowers, and has for one of its objects to provide a lawn-mower with a self-operating power-motor and a revolving knife-reel, the motor being so placed on the frame as to be located in the draft of air produced by the revolving knives for the purpose of cooling the motor.

Another object is to provide a flexible shaft connection between the motor and the driving-gear of the mower whereby all shocks due to the sudden stoppage of the mower from any cause are absorbed and the breakage of gears or other parts of the mechanism prevented.

A further object is to provide means for preventing the cut grass from being thrown upon the motor and also to provide means for disconnecting the motor at any time, so that the mower may be operated by hand whenever desired.

In the accompanying drawings, Figure 1 is a rear view of my improved motor lawn-mower, the push-handle being removed and a portion of the driving-gear being shown in section; and Fig. 2 is a transverse section of the mower, showing the motor in elevation.

The main part of the mower proper may be of the ordinary type, comprising the driving gear-wheels 1, mounted to turn upon the axles 25 of the frame-plates 3 and provided with internal gear-teeth 2 for driving the pinions of the shaft 5 of the knife-reel 6 in the usual way. Curved knife-blades 7 are carried by the reel and coöperate with the cutter-bar 26, supported on the frame, the plates 3 being joined by tie-rod 4, also forming part of the frame.

On the tie-rod 4 is mounted the power-motor for operating the mower, and while the invention is not limited to any particular kind of motor I have illustrated as a preferred form an ordinary gasolene-motor comprising a crank-case 15, cylinder 16, and carbureter 17, the crank-case being provided with a clamping-bracket 24 for securing the same to the tie-rod 4. As small gasolene-motors of this size are adapted to run at high rates of speed, I prefer to provide the crank-shaft 23 with a small gear 21, meshing with a larger gear 20 on the shaft 14 for the purpose of reducing the speed of this operating-shaft, which is journaled in bearings carried by the crank-case and operates the flexible spring-shaft 10 through the friction-clutch members 13 and 11. The outer end of the flexible shaft is secured to the pinion or gear-wheel 9, which meshes with the internal gear-teeth of driving-wheel 1 and operates the same. On the shaft 14 is mounted cam 19 for operating the valve-stem 18 of the motor. The flexible shaft 10 is preferably inclosed in a tubular casing, which is rigidly secured between the frame-plate 3 and the motor-casing, and a handle 12 is provided for throwing the clutch into and out of gear.

The motor is supported on the frame opposite the revolving knife-reel and in the draft or blast of air produced by said revolving reel, which acts like a fan to cool the motor, and in order to prevent the cut grass from being thrown upon the motor a cylindrical wire screen 22 is placed over the motor.

It will now be apparent that all that is necessary to be done in applying my improvement to existing types of lawn-mowers is to tap a hole into the frame-plate 3 for securing the tubular casing of the flexible shaft, to insert the pinion 9 within the driving-wheel, and to clamp the motor to the tie-rod 4.

In the operation of the device the motor is started by first pushing the mower by means of the hand-bar 27. Then as the motor begins to work the operator merely guides the lawn-mower. The rapidly-revolving knife-reel then acts as a fan to create a blast of air over the motor-cylinder, thus insuring the removal of heat and keeping the motor cool, the motor being so placed as to receive the air to the best advantage for the radiation of heat. The motor may be instantly cut out at any moment by means of the clutch-lever 12 whenever for any reason it is desired to run the lawn-mower by hand, as when operating in close proximity to a tree or other object, and this lever may be thrown by the foot of the operator.

By means of the flexible spring-shaft inserted between the motor-driving shaft and the main driving-gear all shocks due to the sudden stoppage of the mower are absorbed and breakage of any parts of the mechanism prevented.

Having now described my invention, what I claim as new, and desire to secure by Letters Patent, is—

1. A motor lawn-mower comprising a frame, a revolving knife-reel and a power-motor for operating the same, the motor being located on the frame in position to receive a blast of air produced by the revolving knives.

2. In a lawn-mower, the combination with a frame, a driving-gear and revolving knives, of a power-motor carried by the frame in position to receive a cooling blast of air from the revolving knives.

3. In a lawn-mower, the combination with a frame, a revolving knife-reel and a power-motor for operating the same located on the frame in position to receive a blast of air produced by the revolving knives, and a screen for preventing the grass from being thrown on the motor.

In testimony whereof I have hereunto set my hand.

ISAAC H. DAVIS.

Witnesses:
   J. S. HATHAWAY,
   EDITH GREER.